United States Patent [19]

Dauvergne

[11] 4,218,887
[45] Aug. 26, 1980

[54] ASSISTED BRAKING DEVICE

[75] Inventor: Jean L. R. Dauvergne, Fosses, France

[73] Assignee: Societe Anonyme Francaise du Ferodo, Paris, France

[21] Appl. No.: 922,233

[22] Filed: Jul. 5, 1978

[30] Foreign Application Priority Data

Jul. 7, 1977 [FR] France .............................. 77 20883
Jun. 27, 1978 [FR] France .............................. 78 19085

[51] Int. Cl.² .............................................. B60T 13/20
[52] U.S. Cl. ........................................ 60/550; 60/551; 60/581; 60/594
[58] Field of Search ................. 60/550, 551, 594, 581; 91/391 R

[56] References Cited

U.S. PATENT DOCUMENTS

| | | | |
|---|---|---|---|
| 1,997,062 | 4/1935 | Huffman | 60/551 |
| 2,229,247 | 1/1941 | Kamenarović | 60/551 |
| 2,323,406 | 7/1943 | Milhaupt | 60/551 |
| 2,846,031 | 8/1958 | Kelley | 60/550 |
| 2,976,849 | 3/1961 | Stelzer | 60/550 |
| 3,808,817 | 5/1974 | Bennett | 60/550 |
| 4,015,881 | 4/1977 | Adachi | 60/581 |
| 4,024,795 | 5/1977 | Sawyer | 91/384 |

FOREIGN PATENT DOCUMENTS

2449612 4/1976 Fed. Rep. of Germany ............ 60/551
545670 6/1942 United Kingdom .

*Primary Examiner*—Abraham Hershkovitz
*Attorney, Agent, or Firm*—Young & Thompson

[57] ABSTRACT

An assisted braking device comprises a master cylinder and piston assembly the piston of which is connected to the piston of an assisting jack by an axially aligned interconnecting element. A brake pedal is adapted to operate the interconnecting element by a thrust member and a lever which is articulated to the interconnecting element and connected at one end to the thrust member; the other end of the lever acts on a distributor which can direct hydraulic fluid under pressure to the existing jack. A force on the brake pedal is transmitted via the thrust member and the lever to the interconnecting element to displace the master piston, and the end of the lever acting on the distributor simultaneously energizes the assisting jack. Safety abutment means which operate in the event of failure of the assisting hydraulic pressure allow displacement of the master piston by the force directly applied through the thrust member.

6 Claims, 6 Drawing Figures

ASSISTED BRAKING DEVICE

BACKGROUND OF THE INVENTION

The present invention relates to an assisted braking device comprising a master piston mounted for sliding in a master cylinder, a jack having piston connected to the master piston by interconnection means, control means comprising a pedal, a source of assisting hydraulic pressure, a distributor adapted to feed the jack with assisting hydraulic pressure from the said source, and lever means adapted to operate the distributor in response to the actuation of the control means. Safety means which may be provided are brought into action in the event of the failure of the assisting hydraulic pressure, in order to enable the master piston to be displaced through the force applied directly by the control means.

In arrangements of this kind the lever means acting on the distributor are generally interposed between on the one hand the control means and on the other hand the jack piston. An arrangement of this kind makes it necessary to take special precautions in respect of sealing and gives rise to considerable friction. Considerable space is required. In addition manual operation in the event of failure of the assistance must overcome obstructing resistance, such as that resulting from the movement of the jack piston, which has become ineffective.

The main object of the present invention is the provision of an assisting braking device which is free from these various disadvantages, whose dimensions are small, and whose construction is simple and strong.

SUMMARY

According to the invention, in a brake of the kind described the lever means adapted to operate the distributor in response to the displacement of the control means comprise an arm which is mounted for rocking by means of an articulation on the interconnection means. A particularly effective construction with reduced dimensions and without loss of stroke is thus obtained.

According to other, preferred characteristics, the safety means comprise a bearing surface which is associated with the control means and which cooperates with the aforesaid articulation, while the interconnection means are connected to the jack piston by a connection which operates in one direction only.

As the result of this arrangement, when the assisting hydraulic pressure fails, the action applied directly by the operator to the control means has the effect of moving the master piston and not the jack piston.

In one embodiment the lever means comprise a lever articulated on the control means at an articulation point situated between the ends of the said lever, one of these ends being mounted for pivoting about a fixed axis while the other receives a link connected to one end of the aforesaid rocking arm, while the other end of the said arm acts on the distributor and the articulation of the said arm on the interconnection means is situated at an intermediate point lying between the ends of the said arm. The lever means thus act in the form of a deformable parallelogram.

The lever, the link, and the rocking arm which constitute the assembly of lever means are preferably divided into two in such a manner as to extend on each side of the axis common to the master cylinder and to the jack.

For safety purposes the braking system advantageously comprises two independent circuits; this arrangement can be achieved either with one master cylinder having two successive chambers in alignment or with two master cylinders placed one beside the other or else disposed concentrically.

In the last-mentioned case, in a preferred embodiment of the invention the jacks and the interconnection means are divided into two in such a manner as to be respectively associated with the two master cylinders. It is advantageous to provide only a single operating arm, which cooperates with the two interconnections means with the aid of guiding slot connections.

In the event of the failure of one of the two independent circuits this arrangement makes it possible for the stroke and the force on the pedal to be indexed to the circuit which remains intact and therefore to save the driver the inconvenience of a longer pedal travel.

DESCRIPTION OF THE PREFERRED EMBODIMENTS

Figure 1:
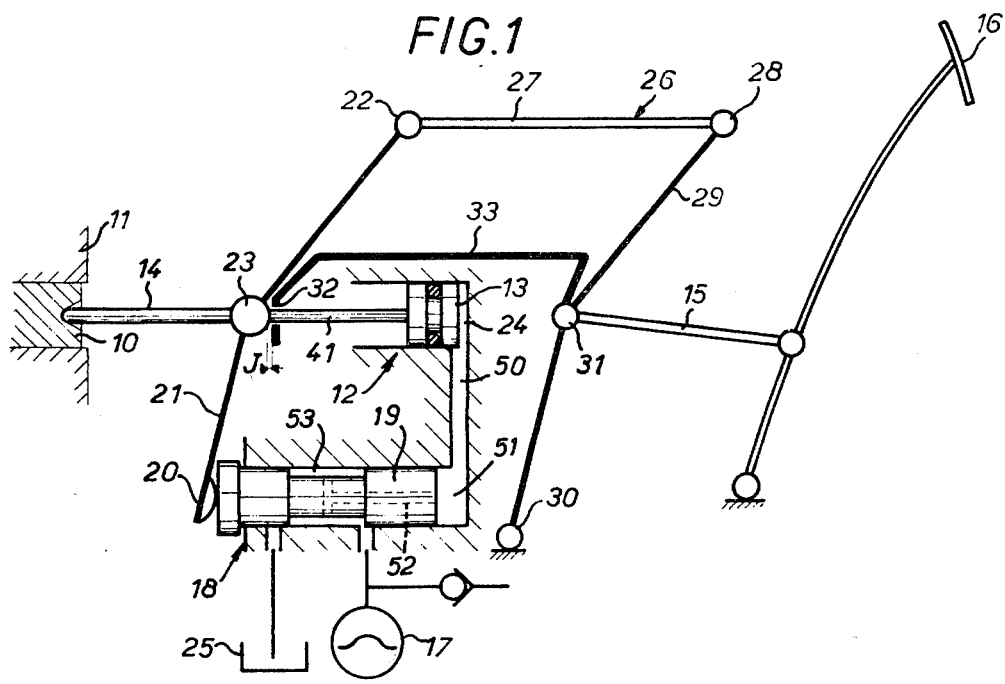
FIG. 1 is a general diagrammatical view of an assisted braking device according to the invention.

In the embodiment illustrated in FIGS. 1 to 4, which relates by way of example without limitation to the application of the invention to the braking of an automobile vehicle, an assisted braking device according to the invention comprises a master piston 10 mounted for sliding in a master cylinder 11.

A jack 12 is axially in alignment with the master cylinder 11 and contains a piston 13 partially defining a chamber 24. The piston 13 is connected to the master piston 10 by axially aligned interconnection means consisting of a rod 14. Control means comprise a rod 15 substantially in alignment with the axis common to the master cylinder 11 and the jack 12, together with a pedal 16.

The hydraulic chamber 24 of the jack 12 is connected by a pipe 50 to a chamber 51 of a distributor 18, whose slide valve can be seen at 19. The chamber 51 is partially defined by the slide valve 19 at one end of the latter and by way of a duct 52 provided in the slide valve 19 is in communication with an intermediate annular groove 53 in the said slide valve 19. The slide valve 19 is subjected to two opposing forces, of which one is developed by the end 20 of an arm 21 which urges it towards the right in FIG. 1, while the other is developed by the hydraulic pressure in the chamber 51 and urges the slide valve to the left in FIG. 1.

Figure 2:
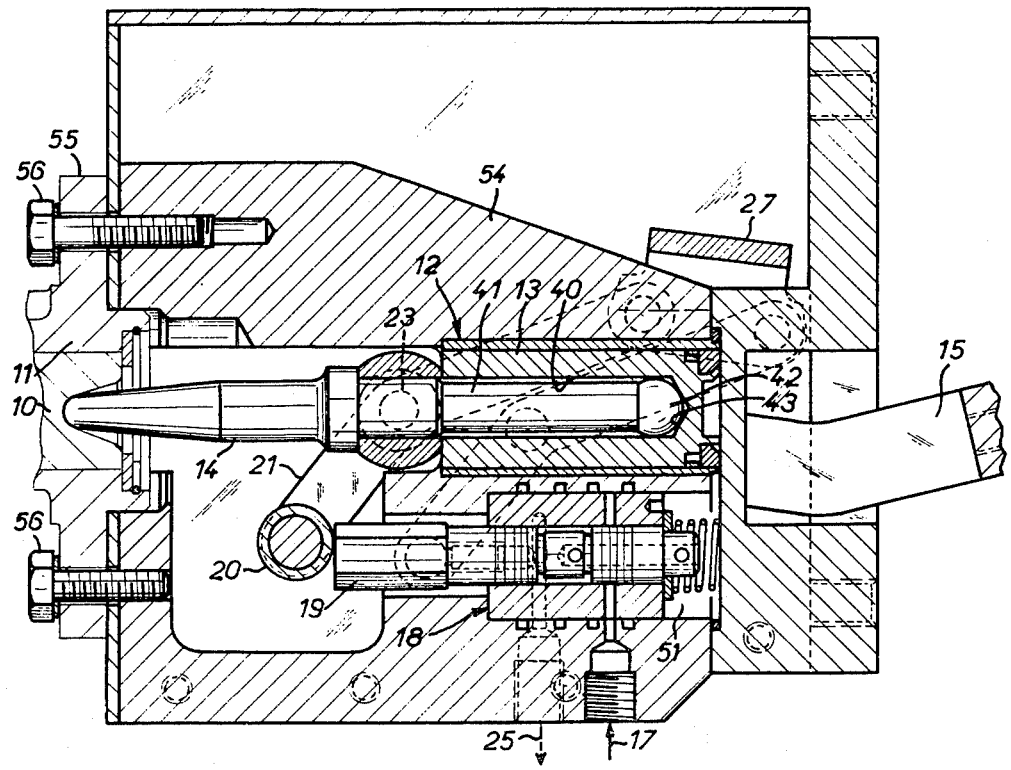
FIG. 2 is a view of this device in longitudinal section on the line II—II in FIG. 3.

It will be noted that the jack 12 and the distributor 18 have a common body 54 fixed to a flange of the master cylinder 11 by screws 56 (FIG. 2). Depending on the position of the slide valve 19, the annular groove 53 can be brought into communication either with a tank 25 or with a source 17 of assisting hydraulic pressure, for example a pressure accumulator associated with a pump.

At 22 can be seen the opposite end of the arm 21 whose end 20 cooperates with the slide valve 19 of the distributor 18. Between the ends 20 and 22 the arm 21 is mounted for rocking by an articulation 23 on the interconnection rod 14.

When the end 20 of the rocking arm 21 does not apply a thrust to the slide valve 19, the pressure source 17 is isolated by this slide valve from the chamber 24 of the jack 12, which chamber is brought into communication with the tank 25.

When the end 20 of the rocking arm 21 applies a thrust to the slide valve 19, the chamber 24 is isolated from the tank 25 and the pressure source is brought into communication in a modulated manner with the chamber 24 of the jack 12.

The arm 21 forms part of an assembly 26 of lever means adapted to operate the slide valve 19 of the distributor 18 in response to a displacement of the control means 15, 16.

More particularly, these lever means 26 comprise a link 27 which is articulated on the arm 21 at 22. The link 27 is articulated at 28 on the end of a lever 29. The latter is mounted for pivoting by its other end about a fixed axis 30. Between its ends 28 and 30 the lever 29 is articulated at 31 on the control rod 15.

Safety means acting by abutment are provided and are brought into operation in the event of the failure of the assisting hydraulic pressure, in order to enable the master piston 10 to be displaced by the force applied directly by the control means 15, 16. The safety means comprise a bearing surface 32 which cooperates with the rod 14 at the articulation 23. The bearing surface 32 is disposed at the end of an extension 33 of the rod 15 and is normally spaced apart by a slight clearance J from the articulation 23 (FIGS. 1, 3 and 4).

It will be appreciated that the lever means 26 constitute a parallelogram and thus make it possible to develop the forces necessary with the smallest possible parts, thus enabling dimensions to be reduced.

Figure 3:
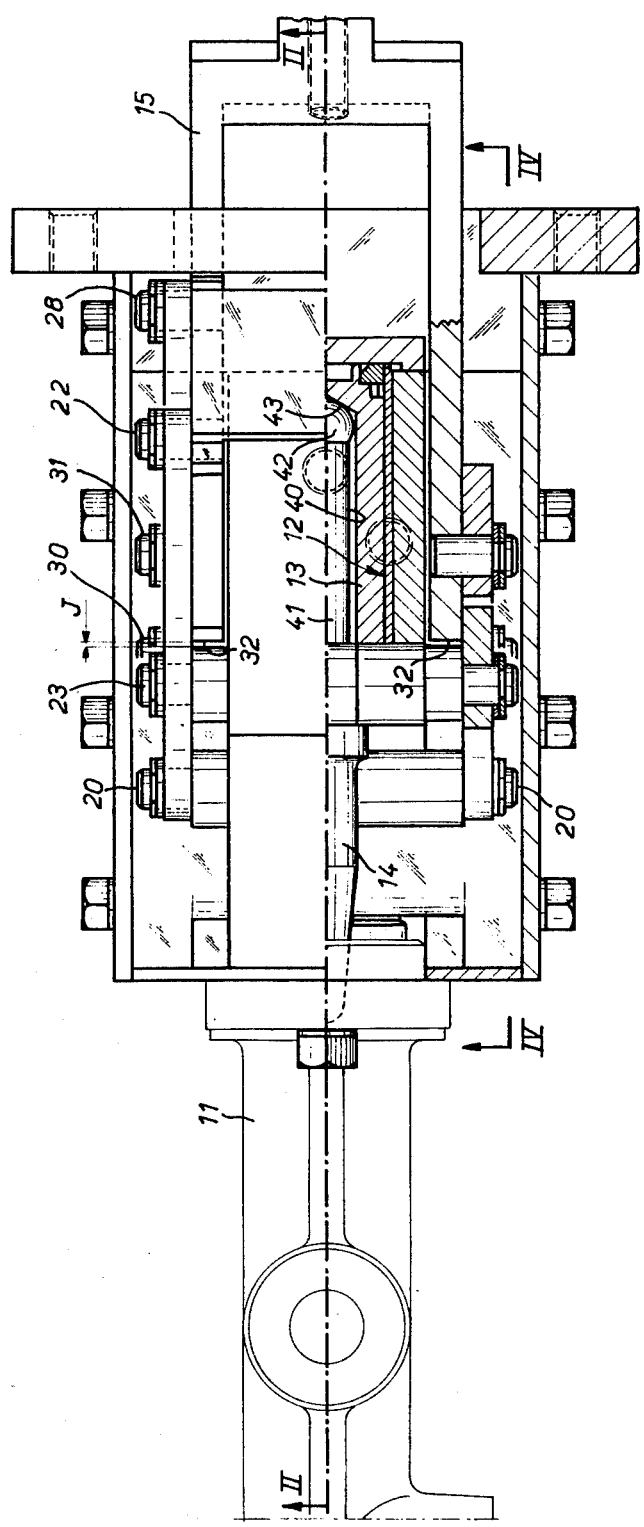
FIG. 3 is a top plan view of this device with parts in section.
Figure 4:
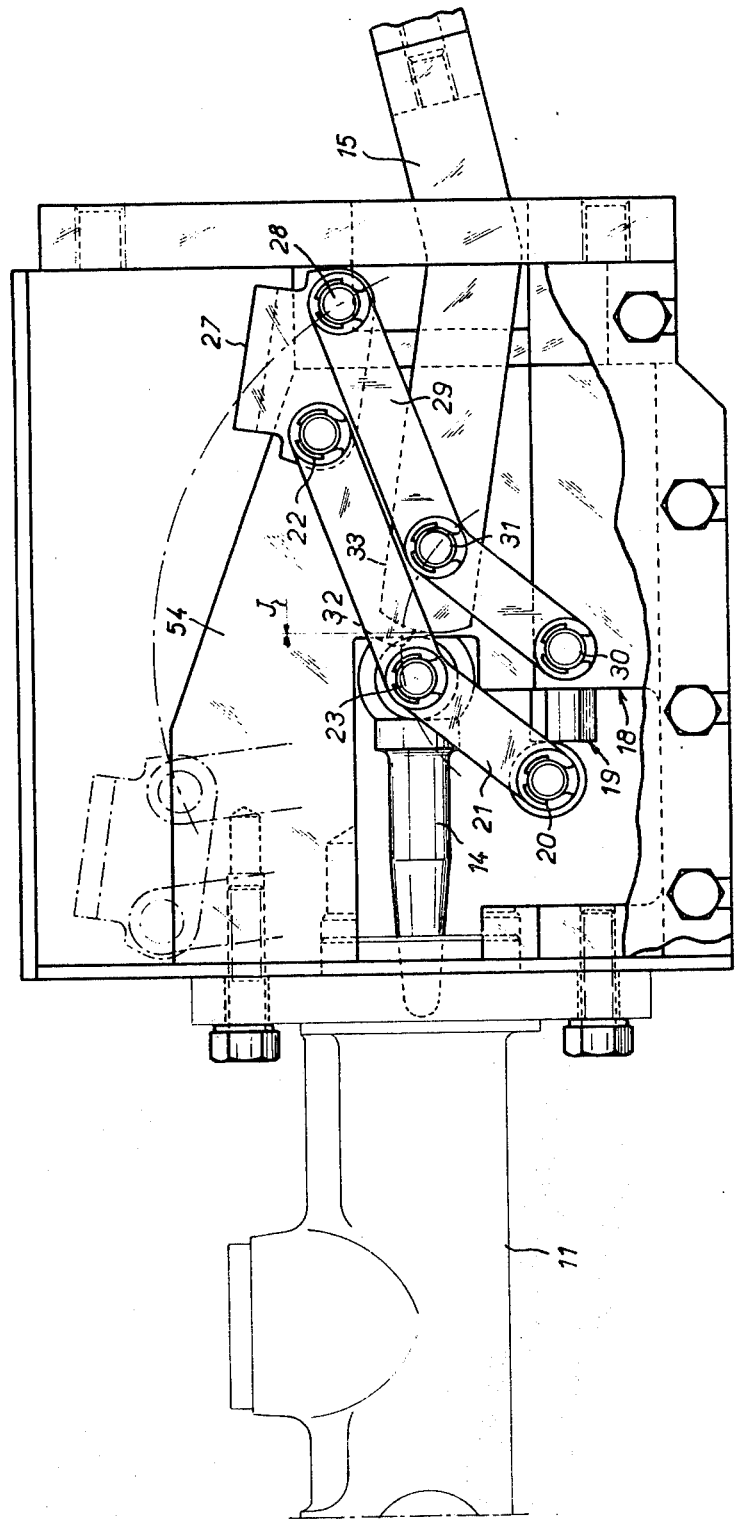
FIG. 4 is a view in side elevation on the line IV—IV in FIG. 3.

The rod 15 and the lever means 26 are preferably divided into two and, as can be seen more particularly in FIG. 3, situated on each side of the axis common to the master cylinder 11 and jack 12. This division into two of the lever means 26 also enables the size of the whole arrangement to be reduced.

As can be seen more particularly in FIG. 2, the interconnection means formed by the rod 14 are mounted on the piston 13 of the jack 12 by a one-direction connection. More particularly, the jack piston 13 is provided with an axial bore 40 in which is simply engaged an end 41 of the rod 14. At its extremity this end 41 has a spherical head 42 cooperating with the bottom 43 of the bore 40. In this way, when in the course of normal operation the piston 13 of the jack 12 is urged towards the left in FIG. 2, it pushes the rod 14 and the master piston 10 towards the left in FIG. 2. On the other hand, if the assisting hydraulic pressure should fail, the bearing surface 32 directly pushes the articulation 23 and consequently the rod 14 towards the left in FIG. 2, but as this is done the end 40 thus driven towards the left leaves the piston 13 in place and the force on the pedal is therefore not increased by the passive resistance which the displacement of this piston 13 would offer.

Operation is as follows:

As long as the brake pedal 16 is not depressed, the lever means 26 do not act at 20 on the slide valve 19 of the distributor 18, and the chamber 24 of the jack 12 is connected to the tank 25.

The interconnection means 14 are therefore not acted on in any way and the master piston 10 remains in the position of rest. No braking occurs.

When the pedal 16 is depressed for braking purposes, the point 31 (FIG. 1) is pushed towards the left, so that through the action of the lever means 26 the slide valve 19 of the distributor 18 is pushed towards the right and the pressure from the source 17 is thus developed in the chamber 24 of the jack 12. The interconnection means 14 are thus pushed towards the left, operating the master piston 10 and thereby effecting the braking. At the same time the pressure delivered by the distributor 18 is established in the chamber 51, which serves as a reaction chamber. This pressure in the chamber 51 has the effect of developing resistance which opposes the movement of the slide valve 19 and, through the action of the lever means 21, 27, 29, provides a feeling of force on the pedal 16, thus giving all the sensitivity required for the operation.

In the event of failure of the hydraulic pressure, braking is effected by the force on the pedal 16 with the aid of the abutment at 32, 23, after absorption of the clearance J, and without the piston 13 of the jack 12 being driven, as previously indicated.

It will be noted that instead of being a pressure accumulator the pressure source 17 may consist of a positive displacement pump. The link 27 could be eliminated and in this case the lever 29 is articulated directly on the arm 21 at a point where the articulations 22 and 28 coincide to form a single articulation.

It will be appreciated that friction is extremely slight, being limited to the friction of the ends 20 of the arm 21 on the slide valve 19. It will also be appreciated that no sealing has to be provided between the control rod 15 and the body 54 (FIG. 2) of the jack 12 and distributor 18.

Figure 5:
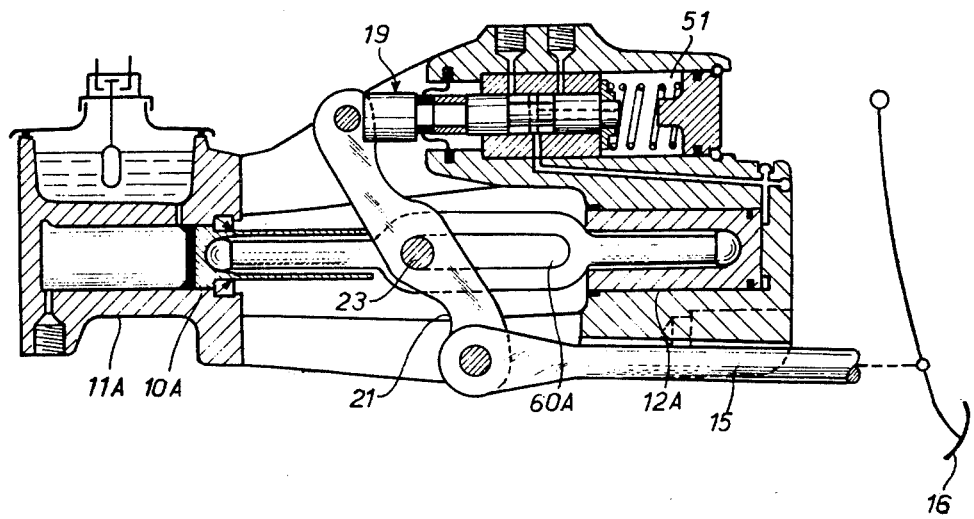
FIG. 5 is a view in vertical section of a modified embodiment.
Figure 6:
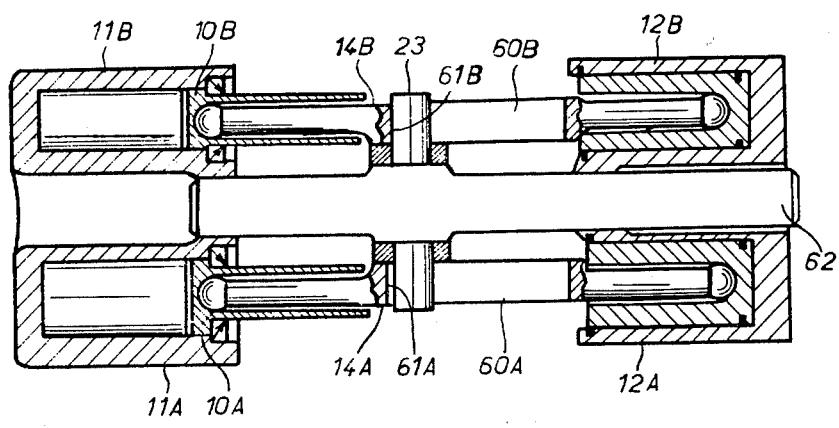
FIG. 6 is a corresponding view of this modified embodiment in horizontal section.

Reference will now be made to FIGS. 5 and 6, in which the arrangement is similar to that which has just been described with reference to FIGS. 1 to 4, particularly as regards the arm 21 which remains undivided and operates the distributor 19 with the aid of a rod 15 actuated directly by the pedal 16.

Here, however, two independent brake circuits are provided for safety reasons and are formed by means of two master cylinders 11A and 11B placed side by side and containing master pistons 10A and 10B.

The jacks 12 are likewise divided into two and respectively designated 12A and 12B, and the likewise divided interconnection means are designated by 14A and 14B.

In addition, instead of being articulated directly on the interconnection means 14A, 14B the arm 21 is articulated by a pivot pin 23 being engaged in two guiding slots 60A and 60B formed respectively in the interconnection means 14A and 14B and having respective ends 61A and 61B.

A guide 62 receiving the pivot pin 23 is mounted for sliding and is intended to take cantilever forces.

In this way, the arm 21 cooperates with that one of the two interconnection means 14A and 14B whose guiding slot end 61B is in contact with its pivot pin 23.

This arrangement provides the advantage of greater safety in the event of the failure of the assistance.

In the event of one of the two circuits associated respectively with the master cylinders 11A and 11B failing, the guiding slot 60A or 60B of the interconnection means 14A or 14B will in fact permit the movement of the defective master piston 10A or 10B without disturbing the operation of the circuit which has remained intact and without imposing on the driver the disadvantage of an additional stroke of the pedal 16 since the pivot pin 23 rests on the end 61A or 61B which is nearer it.

It should be noted that the arrangement shown in FIGS. 5 and 6 could be replaced by a coaxial arrangement with telescopic engagement of the various components.

I claim:

1. An assisted braking device comprising a master piston mounted for sliding in a master cylinder, a jack in axial alignment with the master cylinder and having a jack piston connected to the master piston by axially aligned interconnection means, thrust means adapted to be operated by a pedal, a source of assisting hydraulic pressure, a distributor adapted to feed the jack with assisting hydraulic pressure from the said source, lever means adapted to operate the distributor in response to a displacement of the thrust means, said lever means comprising an arm of which one end acts on the said distributor, said arm including an articulation by which said arm is mounted for rocking on the said interconnection means, and safety abutment means normally spaced from said arm and said articulation and for bearing against said articulation in the event of the failure of the assisting hydraulic pressure to displace the master piston through the force directly applied by the thrust means.

2. An assisted braking device according to claim 1, wherein the safety abutment means comprise a bearing surface which is associated with the thrust means and which cooperates with the aforesaid articulation.

3. An assisted braking device according to claim 1 wherein the interconnection means are connected to the jack piston by a one-direction connection.

4. An assisted braking device according to claim 1, wherein the lever means comprise a lever articulated on the thrust means at an articulation point situated between the ends of the said lever, one of the ends being pivoted about a fixed axis while the other receives a link connected to one end of the aforesaid arm, the other end of the said arm acting on the distributor, while the articulation of the said arm on the interconnection means is situated at an intermediate point lying between the ends of the said arm.

5. An assisted braking device according to claim 4, wherein the thrust means and the lever means are divided into two in such a manner as to extend on each side of the axis common to the master cylinder and to the jack.

6. An assisted braking device as claimed in claim 1, there being two said master pistons mounted for sliding in two said master cylinders, there being a pair of said jacks each in axial alignment with a respective one of said master cylinders and having a said jack piston connected to the associated said master piston by axially aligned interconnection means which are divided in two, said arm being disposed between said interconnection means and including a pair of oppositely extending articulations by which said arm is mounted for rocking on and between said interconnection means, each part of said interconnection means having a sliding guide therein within each of which an oppositely extending said articulation is disposed, said articulations being adapted to transmit thrust to an end of each of said sliding guides thereby to transmit thrust from said arm to one of said master pistons in the event of failure of the circuit associated with the other said master piston.

* * * * *